(12) United States Patent
Shen et al.

(10) Patent No.: US 10,936,642 B2
(45) Date of Patent: *Mar. 2, 2021

(54) USING MACHINE LEARNING TO FLAG GENDER BIASED WORDS WITHIN FREE-FORM TEXT, SUCH AS JOB DESCRIPTIONS

(71) Applicant: SAP SE, Walldorf (DE)

(72) Inventors: Weiwei Shen, Palo Alto, CA (US); Manish Tripathi, San Francisco, CA (US)

(73) Assignee: SAP SE, Walldorf (DE)

( * ) Notice: Subject to any disclaimer, the term of this patent is extended or adjusted under 35 U.S.C. 154(b) by 61 days.

This patent is subject to a terminal disclaimer.

(21) Appl. No.: 16/267,788

(22) Filed: Feb. 5, 2019

(65) Prior Publication Data
US 2019/0171874 A1 Jun. 6, 2019

Related U.S. Application Data

(63) Continuation of application No. 15/801,982, filed on Nov. 2, 2017, now Pat. No. 10,242,260.

(51) Int. Cl.
*G06F 16/35* (2019.01)
*G06K 9/62* (2006.01)
(Continued)

(52) U.S. Cl.
CPC .......... *G06F 16/353* (2019.01); *G06F 40/174* (2020.01); *G06F 40/205* (2020.01);
(Continued)

(58) Field of Classification Search
CPC ............. G06F 17/243; G06F 17/30707; G06F 17/30716; G06F 16/353; G06F 16/34; G06F 40/205; G06F 40/30; G06F 40/174; G06K 9/00456; G06K 9/00483; G06K 9/6259; G06K 9/628; G06N 99/005; G06N 20/00; G06Q 10/1053
(Continued)

(56) References Cited

U.S. PATENT DOCUMENTS

| | | | | |
|---|---|---|---|---|
| 6,640,207 B2* | 10/2003 | Witschel | ............... | G10L 15/197 704/257 |
| 8,379,937 B1* | 2/2013 | Moon | ................... | G06K 9/4609 382/118 |
| 10,438,135 B2* | 10/2019 | Larsen | ................... | G06N 20/00 |
| 2006/0173731 A1* | 8/2006 | Scarpelli | .......... | G06Q 10/06398 705/7.19 |

(Continued)

*Primary Examiner* — Andrew R Dyer
(74) *Attorney, Agent, or Firm* — Jones Day

(57) ABSTRACT

Under one aspect, first user input including free-form text is received in a first graphical user interface (GUI). A classification engine of the computer system incorporating a machine learning model classifies words of the free-form text into a male-biased class, a female-biased class, or a neutral class. At least one of the words is classified into the male-biased class or the female-biased class. At least one of the words classified into the male-biased class or the female-biased class is flagged in the first GUI. Second user input is received in the first GUI including at least one revision to at least one of the words of the free-form text classified into the male-biased class or the female-biased class responsive to the flagging. The revised free-form text is posted to a web site for display in a second GUI.

20 Claims, 5 Drawing Sheets

(51) Int. Cl.
*G06K 9/00* (2006.01)
*G06N 20/00* (2019.01)
*G06F 40/30* (2020.01)
*G06F 40/174* (2020.01)
*G06F 40/205* (2020.01)
*G06Q 10/10* (2012.01)
*G06F 16/34* (2019.01)

(52) U.S. Cl.
CPC ......... *G06F 40/30* (2020.01); *G06K 9/00483* (2013.01); *G06K 9/628* (2013.01); *G06K 9/6259* (2013.01); *G06N 20/00* (2019.01); *G06F 16/34* (2019.01); *G06Q 10/1053* (2013.01)

(58) Field of Classification Search
USPC ................ 715/224, 254, 255, 256, 260, 271
See application file for complete search history.

(56) References Cited

U.S. PATENT DOCUMENTS

| | | | |
|---|---|---|---|
| 2007/0150426 A1* | 6/2007 | Asher | G06K 9/6272 706/20 |
| 2015/0371191 A1* | 12/2015 | Taylor | G06Q 10/1053 705/321 |
| 2016/0055457 A1* | 2/2016 | Mather | G06Q 10/1053 705/321 |
| 2016/0350672 A1* | 12/2016 | Snyder | H04L 51/32 |
| 2017/0236073 A1* | 8/2017 | Borisyuk | G06Q 50/01 706/12 |
| 2017/0293858 A1* | 10/2017 | Larsen | G06Q 30/02 |
| 2017/0346921 A1* | 11/2017 | Ghani | H04L 67/306 |
| 2018/0082258 A1* | 3/2018 | Mather | G06Q 10/1053 |
| 2018/0089628 A1* | 3/2018 | Mather | G06Q 10/1053 |
| 2018/0089629 A1* | 3/2018 | Mather | G06Q 10/1053 |
| 2018/0096306 A1* | 4/2018 | Wang | G06Q 10/1053 |
| 2018/0165554 A1* | 6/2018 | Zhang | G06K 9/6269 |

* cited by examiner

FIG. 4

USING MACHINE LEARNING TO FLAG GENDER BIASED WORDS WITHIN FREE-FORM TEXT, SUCH AS JOB DESCRIPTIONS

RELATED APPLICATION

This application is a continuation of U.S. patent application Ser. No. 15/801,982 filed on Nov. 2, 2017, the contents of which are hereby fully incorporated by reference.

TECHNICAL FIELD

The subject matter described herein relates to computational analysis of free-form text.

BACKGROUND

Some computational systems are configured so as to receive, store, and process free-form text entries from users, e.g., single sentence or multiple sentence entries that may not have a predefined structure. For example, certain computational systems for use in managing data relating to employment at a company can be configured so as to receive and store job descriptions that are entered by users, so as to post such job descriptions to a web site, e.g., a site that is internal to or external to the company, and optionally also to receive, store, and process data that job applicants may submit when applying for those jobs. Such job descriptions may not be computationally analyzed before being posted, other than perhaps being checked automatically for spelling and grammar.

SUMMARY

Use of machine learning to flag gender biased words within free-form text, such as job descriptions, is provided herein.

Under one aspect, a method is provided that includes receiving, in a first graphical user interface (GUI) forming part of an end-user layer of a computer system, first user input including free-form text. The method also includes respectively classifying, by a classification engine of the computer system incorporating a machine learning model, words of the free-form text into a male-biased class, a female-biased class, or a neutral class. At least one of the words is classified into the male-biased class or the female-biased class. The method also includes flagging, in the first GUI, at least one of the words classified into the male-biased class or the female-biased class. The method also includes receiving, in the first GUI, second user input including at least one revision to at least one of the words of the free-form text classified into the male-biased class or the female-biased class responsive to the flagging. The method also includes posting, by the computer system, the revised free-form text to a web site for display in a second GUI forming part of the end-user layer of the computer system.

In some configurations, the method optionally further includes generating, by a scoring engine of the computer system, a gender bias score for the free-form text based on the classification of the words of the free-form text; and displaying, in the first GUI, the gender bias score. Optionally, the method further includes respectively classifying, by the classification engine of the computer system, each word of the revised free-form text into the male-biased class, the female-biased class, or the neutral class. At least one of the words is classified into the male-biased class or the female-biased class. The method also can include generating, by the scoring engine of the computer system, a revised gender bias score for the revised free-form text based on the classification of the words of the revised free-form text; and displaying, in the first GUI, the revised gender bias score.

In some configurations, the method optionally further includes training the classification engine of the computer system using a corpus of words. The words of the corpus are respectively labeled as male-biased, female-biased, or neutral. Optionally, a first subset of words of the corpus are labeled as male-biased, female-biased, or neutral using operations that include generating, from a plurality of job descriptions, a first subset of the job descriptions that includes data regarding the respective genders of applicants to that job. The jobs can be within job families. The operations also can include generating, for each job description of the first subset, a gender ratio based on the data regarding the respective genders of applicants to that job. The operations also can include selecting, from each job family, a job description that has the highest gender ratio and a job description that has the lowest gender ratio. The operations also can include generating a second subset of the job descriptions including the selected job descriptions of the job families that have the highest gender ratios. The operations also can include generating a third subset of the job descriptions including the selected job descriptions of the job families that have the lowest gender ratios. The operations also can include comparing frequencies of words of the job descriptions of the second and third subsets of the job descriptions. The operations also can include, based on the comparing, labeling at least one word of the job descriptions of the second subset of the job descriptions as being one of male-biased and female-biased, and labeling at least one word of the job descriptions of the third set of the job descriptions as being the other of male-biased and female-biased.

In some configurations, the flagging includes highlighting the word, changing a color of the word, changing an emphasis of the word, or changing a font of the word. In some configurations, the flagging includes displaying the word in an area of the first GUI that is separate from the free-form text.

Under another aspect, a computer system is provided that includes at least one data processor; and memory storing instructions which, when executed by the at least one data processor, result in operations. The operations include receiving, in a first graphical user interface (GUI) forming part of an end-user layer of the computer system, first user input including free-form text. The operations include respectively classifying, by a classification engine of the computer system incorporating a machine learning model, words of the free-form text into a male-biased class, a female-biased class, or a neutral class. At least one of the words is classified into the male-biased class or the female-biased class. The operations include flagging, in the first GUI, at least one of the words classified into the male-biased class or the female-biased class. The operations include receiving, in the first GUI, second user input including at least one revision to at least one of the words of the free-form text classified into the male-biased class or the female-biased class responsive to the flagging. The operations include posting, by the computer system, the revised free-form text to a web site for display in a second GUI forming part of the end-user layer of the computer system.

In some configurations, the memory further stores instructions which, when executed by the at least one data processor, result in operations that include generating, by a scoring engine of the computer system, a gender bias score for the free-form text based on the classification of the words of the free-form text; and displaying, in the first GUI, the gender bias score.

In some configurations, the memory further stores instructions which, when executed by the at least one data processor, result in operations that include respectively classifying, by the classification engine of the computer system, each word of the revised free-form text into the male-biased class, the female-biased class, or the neutral class. At least one of the words is classified into the male-biased class or the female-biased class. The operations also include generating, by the scoring engine of the computer system, a revised gender bias score for the revised free-form text based on the classification of the words of the revised free-form text; and displaying, in the first GUI, the revised gender bias score.

In some configurations, the memory further stores instructions which, when executed by the at least one data processor, result in operations that include training the classification engine of the computer system using a corpus of words. The words of the corpus are respectively labeled as male-biased, female-biased, or neutral. In some configurations, a first subset of words of the corpus are labeled as male-biased, female-biased, or neutral using operations that include generating, from a plurality of job descriptions, a first subset of the job descriptions that includes data regarding the respective genders of applicants to that job. The jobs are within job families. The operations also can include generating, for each job description of the first subset, a gender ratio based on the data regarding the respective genders of applicants to that job. The operations also can include selecting, from each job family, a job description that has the highest gender ratio and a job description that has the lowest gender ratio. The operations also can include generating a second subset of the job descriptions including the selected job descriptions of the job families that have the highest gender ratios. The operations also can include generating a third subset of the job descriptions including the selected job descriptions of the job families that have the lowest gender ratios. The operations also can include comparing frequencies of words of the job descriptions of the second and third subsets of the job descriptions. The operations also can include, based on the comparing, labeling at least one word of the job descriptions of the second subset of the job descriptions as being one of male-biased and female-biased, and labeling at least one word of the job descriptions of the third set of the job descriptions as being the other of male-biased and female-biased.

In some configurations, the flagging includes highlighting the word, changing a color of the word, changing an emphasis of the word, or changing a font of the word. In some configurations, the flagging includes displaying the word in an area of the first GUI that is separate from the free-form text.

Under still another aspect, a non-transitory computer-readable medium is provided that stores instructions which, when executed by at least one data processor of a computer system, result in operations. The operations can include receiving, in a first graphical user interface (GUI) forming part of an end-user layer of the computer system, first user input including free-form text. The operations also can include respectively classifying, by a classification engine of the computer system incorporating a machine learning model, words of the free-form text into a male-biased class, a female-biased class, or a neutral class. At least one of the words is classified into the male-biased class or the female-biased class. The operations also can include flagging, in the first GUI, at least one of the words classified into the male-biased class or the female-biased class. The operations also can include receiving, in the first GUI, second user input including at least one revision to at least one of the words of the free-form text classified into the male-biased class or the female-biased class responsive to the flagging. The operations also can include posting, by the computer system, the revised free-form text to a web site for display in a second GUI forming part of the end-user layer of the computer system.

In some configurations, the medium further stores instructions which, when executed by the at least one data processor, result in operations including generating, by a scoring engine of the computer system, a gender bias score for the free-form text based on the classification of the words of the free-form text; and displaying, in the first GUI, the gender bias score. Optionally, the operations further include respectively classifying, by the classification engine of the computer system, each word of the revised free-form text into the male-biased class, the female-biased class, or the neutral class. At least one of the words is classified into the male-biased class or the female-biased class. Optionally, the operations further include generating, by the scoring engine of the computer system, a revised gender bias score for the revised free-form text based on the classification of the words of the revised free-form text; and displaying, in the first GUI, the revised gender bias score.

In some configurations, the medium further stores instructions which, when executed by the at least one data processor, result in operations including training the classification engine of the computer system using a corpus of words. The words of the corpus are respectively labeled as male-biased, female-biased, or neutral. In some configurations, a first subset of words of the corpus are labeled as male-biased, female-biased, or neutral using operations that include generating, from a plurality of job descriptions, a first subset of the job descriptions that includes data regarding the respective genders of applicants to that job. The jobs are within job families. The operations can include generating, for each job description of the first subset, a gender ratio based on the data regarding the respective genders of applicants to that job. The operations can include selecting, from each job family, a job description that has the highest gender ratio and a job description that has the lowest gender ratio. The operations can include generating a second subset of the job descriptions including the selected job descriptions of the job families that have the highest gender ratios. The operations can include generating a third subset of the job descriptions including the selected job descriptions of the job families that have the lowest gender ratios. The operations can include comparing frequencies of words of the job descriptions of the second and third subsets of the job descriptions. The operations can include, based on the comparing, labeling at least one word of the job descriptions of the second subset of the job descriptions as being one of male-biased and female-biased, and labeling at least one word of the job descriptions of the third set of the job descriptions as being the other of male-biased and female-biased.

In some configurations, the flagging includes highlighting the word, changing a color of the word, changing an emphasis of the word, changing a font of the word, or displaying the word in an area of the first GUI that is separate from the free-form text.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, process flows can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the present subject matter can provide for automatic detection of gender-biased words within free-form text based on machine learning techniques. The gender-biased words can be automatically provided to a user within a graphical user interface. Such automatic processing can be integrated within a wide range of applications and types of free-form text.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 4 is an example GUI illustrating flagging of gender biased words within a job description and display of a gender bias score for the job description.

Like reference symbols in the various drawings indicate like elements.

DETAILED DESCRIPTION

The systems, computer-readable media, and methods provided herein can use a classification engine incorporating a machine learning model to classify words of free-form text within a graphical user interface (GUI), such as job descriptions being entered into a GUI of a recruiting system, into various classes indicative of the likelihood that such words are gender-biased. For example, words of a job-description respectively can be classified as being in a male-biased class, a female-biased class, or a neutral class, and such classifications can be used generate revised free-form text within the GUI that reduces the use of words in the male-biased class and/or female-biased class. Illustratively, words of the free-form text that are classified as being in the in the male-biased class or the female-biased class can be flagged within the GUI, for example by highlighting the word within the GUI, or by displaying the word in an area of the GUI that is separate from the free-form text. The free-form text can be revised within the GUI responsive to such flagging, e.g., so as to revise at least one of the words in the male-biased class and/or female-biased class, such as by deleting that word or replacing the word with one that is not in the female-biased or male-biased class, resulting in free-form text that includes fewer gender-biased words. The revised free-form text can be posted on a web site for display in another GUI of the recruiting system. In examples in which the revised free-form text includes a job description, applicants to the job can be expected to be more gender balanced than they would have been for the original job description which included more gender-biased words. A more balanced pool of applicants can be expected ultimately to yield a hiring of a better candidate for that job.

Figure 1:
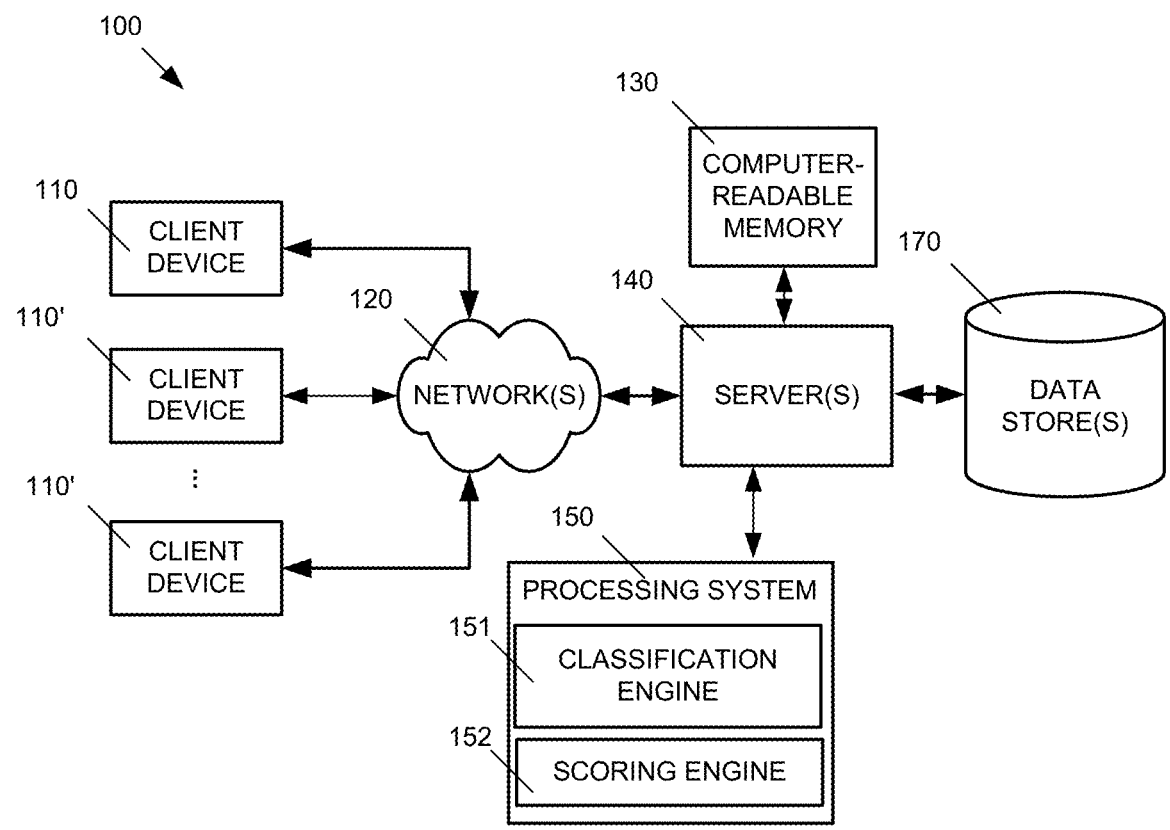
FIG. 1 is a system diagram illustrating an example computer system for use in connection with the current subject matter.

FIG. 1 is a system diagram illustrating an example computer system 100 for use in connection with the certain subject matter. System 100 can include at least one data processor, and memory storing instructions which, when executed by the at least one data processor, result in operations provided herein. In system 100, one or more client devices 110, 110' within an end-user layer of system 100 can be configured to access one or more servers 140 running one or more classification engines 151 and scoring engines 152 on one or more processing systems 150 via one or more networks 120. Alternatively, one or more of client device 110 and server 140 can be the same computing device, eliminating the need for network 120. One or more servers 140 can access computer-readable memory 130 as well as one or more data stores 170.

In one exemplary configuration, one or more of client devices 110 corresponds to a recruiting node including a first GUI via which a user can enter free-form text into system 100, e.g., via which a recruiter for a company can enter a job description into system 100; one or more of client devices 110' corresponds to a job seeker node including a second GUI via which a user can search for jobs based on respective job descriptions, e.g., via a web site to which the job descriptions are posted, and optionally also apply for such jobs; and server(s) 140 correspond to a human resources hub coupled to recruiting node(s) 110 and to job seeker node(s) 110' and configured to flag gender biased words within job descriptions entered within the first GUI at recruiting node(s) 110, to receive revised job postings within the first GUI responsive to the flagging, and to post the revised job postings within the second GUI at job seeker node(s) 110'.

Recruiting node(s) 110 and job seeker node(s) 110' each can include, for example, a respective central processing unit and a computer-readable medium storing instructions for causing the respective central processing unit to perform one or more operations such as provided herein. For example, a computer-readable medium can store instructions causing the central processing unit of recruiting node(s) 110 to generate a GUI for receiving a job posting, for flagging gender-biased words within that job posting, and for receiving a revised job posting responsive to said flagging. As another example, a computer-readable medium can store instructions causing the central processing unit of job seeker node(s) 110' to generate a GUI for posting, on a web site, the revised job posting.

Human resources hub 140 can be configured so as to receive job postings received by the GUIs of recruiting node(s) 110; to classify as gender-biased one or more words within such job postings; to transmit to recruiting node(s)

110 information for use in flagging gender-biased words within the GUIs of recruiting node(s) 110; to receive revised job postings received by the GUIs of recruiting node(s) 110 responsive to the flagging; and to transmit the revised job postings to GUIs of job seeker node(s) 110'. For example, human resources hub 140 can be configured so as to provide job postings received from recruiting node(s) 110 to processing system 150 for processing by classification engine 151 in a manner such as described in greater detail herein. Optionally, processing system 150 can include scoring engine 152 configured to generate gender bias scores for job descriptions and/or for revised job descriptions for display within the GUIs of recruiting node(s) 110 in a manner such as described in greater detail herein, e.g., for use in revising or further revising the job descriptions.

Illustratively, processing system 150 can include a central processing unit and a computer-readable medium storing instructions (e.g., classification engine 151 and optional scoring engine 152) for causing the central processing unit to perform one or more operations such as provided herein, e.g., so as respectively to classify words of the free-form text (or revised free-form text) into a male-biased class, a female-biased class, or a neutral class; optionally so as to generate a gender bias score for the free-form text (or revised free-form text); for training the classification engine 151; for labeling words of a corpus of words as male-biased, female-biased, or neutral for use in training the classification engine; and for providing data to recruiting node(s) 110 and job seeker node(s) 110' for use in respective GUI thereof.

Accordingly, system 100 can include at least one data processor (e.g., processor(s) of client devices 110, 110' and processing system 150) and memory (e.g., non-transitory computer-readable media of client devices 110, 110' and processing system 150) storing instructions which, when executed by the at least one data processor, result in operations including receiving, in a first GUI forming part of an end-user layer of the computer system, first user input including free-form text. For example, the instructions can cause a GUI of a client device 110, such as a recruiting node 110, to receive free-form text, such as a job description. The operations also can include respectively classifying, by a classification engine of the computer system incorporating a machine learning model, words of the free-form text into a male-biased class, a female-biased class, or a neutral class, at least one of the words being classified into the male-biased class or the female-biased class. For example, the instructions can cause processing system 150 to receive the free-form text from client device 110 and to input the free-form text to classification engine 151, and can cause classification engine 151 respectively to classify words of the free-form text into the male-biased class or the female-biased class. The operations also can include flagging, in the graphical user interface, at least one of the words classified into the male-biased class or the female-biased class. For example, the instructions can cause processing system 150 to transmit to client device 110 any words of the free-form text that are classified into the male-biased class or the female-biased class, together with the respective classifications of such words. The instructions can cause the GUI of client device 110, responsive to receiving the words and respective classifications, to flag the received words and indicate their respective classifications. The instructions can cause the GUI of client device 110 to receive second user input including at least one revision to at least one of the words of the free-form text classified into the male-biased class or the female-biased class responsive to the flagging. The instructions can cause posting, by the computer system, the revised free-form text to a web site for display in a second graphical user interface forming part of the end-user layer of the computer system. For example, the instructions can cause the GUI of client device 110 to receive the revision to the free-form text; can cause client device 110 to transmit the revised free-form text to server(s) 140; can cause server(s) 140 to transmit the revised free-form text to client device 110', and can cause the GUI of client device 110' to display the revised free-form text, e.g., to post the revised free-form text to a web site, such as a recruiting website.

Figure 2:
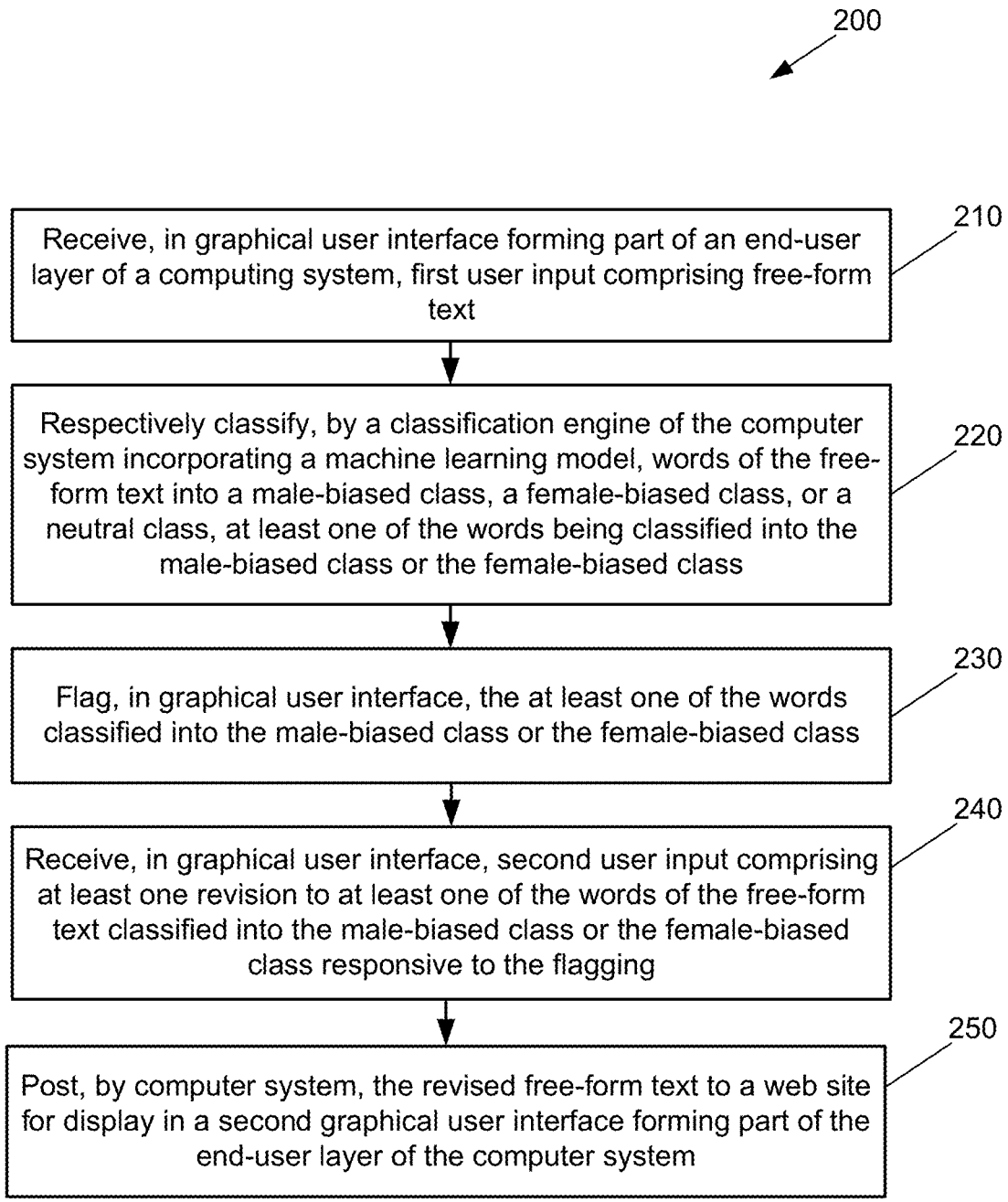
FIG. 2 is an example process flow diagram for flagging gender biased words within free-form text, such as job descriptions.

FIG. 2 is an example process flow diagram 200 for flagging gender biased words within free-form text, such as job descriptions. Process flow 200 includes an operation 210 of receiving, in a first graphical user interface forming part of an end-user layer of a computer system, first user input including free-form text. The free-form text can include a job description or any other suitable text. For example, a GUI at client device 110 illustrated in system 100 of FIG. 1 can receive user input that includes free-form text, such as a job description. Optionally, the user input can include other data associated with the free-form text. Illustratively, where the free-form text includes a job description, such other data can include one or more of a requisition identification (ID) number associated with the job, a position number of the job, a job code for the job, an identification of one or more languages in which the job description is to be posted, a default language of the job description, an internal job title, an external job title, and a job start date. Illustratively, the job code can be or include an O*NET job code or other standard code. Such job codes can be grouped by family. For example, the O-NET-SOC taxonomy defines a set of occupations across the world of work. Based on the Standard Occupational Classification (SOC) from the U.S. Bureau of Labor Statistics, the O*NET-SOC taxonomy currently includes 974 occupations (corresponding to job codes) which are grouped into 23 major groups (corresponding to job families). In some configurations, the GUI of the client device 110 can receive the free-form text, and any other data that may be associated with the free-form text, via fillable or selectable elements in a web page displayed by the client device 110. Optionally, such web page can be hosted by server(s) 140. Client device 110 optionally can be configured so as to transmit the free-form text, and any other data that may be associated with the free-form text, to server(s) 140 via network(s) 120. Optionally, client device 110 locally stores this information, e.g., in a non-transitory computer-readable medium.

Process flow 200 illustrated in FIG. 2 further includes an operation 220 of respectively classifying, by a classification engine of the computer system incorporating a machine learning model, words of the free-form text into a male-biased class, a female-biased class, or a neutral class. In some configurations, at least one of the words is classified into the male-biased class or the female-biased class. For example, in system 100 illustrated in FIG. 1, server(s) 140 running classification engine 151 on processing system 150 can operation 220 on the free-form text received from client device 110. In another example, client device 110 can be configured so as to perform operation 220 on the free-form text, without the need to send the text to a separate processing system.

In some configurations, operation 220 can include preprocessing the free-form text, e.g., so as suitably to prepare the text for classification of certain words therein, e.g., by converting raw free-form text received by the GUI into a string of words. Illustratively, such preprocessing can include one or more of the following operations, and optionally can include all of the following operations. Such preprocessing operations can include text cleaning, e.g., parsing the free-form text so as to extract the text (e.g., words and punctuation) for further processing, which extraction can remove special characters, universal resource locators (URLs), and the like. Software resources for performing such text cleaning are publicly available, such as the BeautifulSoup software package for Python. Such preprocessing operations also or alternatively can include tokenization, e.g., dividing the text into a sequence of tokens that correspond to words in the text. Such tokenization can, for example, parse the text and divide the text into tokens based on the presence of whitespace (e.g., spaces) and/or punctuation. Software resources for performing such text cleaning are publicly available, such as the NLTK.word_tokenize software package for Python. Such preprocessing operations also or alternatively can include part of speech (POS) tagging, e.g., parsing the text and tagging words according to their respective parts of speech. POS tagging can attach a POS tag to each word, e.g., using "RB" for adverbs, "NN" for nouns, "VBP" for present tense verbs, and the like. Software resources for performing such POS tagging are publicly available, such as the NLTK.pos_tag software package for Python. Additionally, the tagged words can be parsed so as to extract only POS that can be expected to potentially have gender bias. For example, it can be expected that POS such as verbs, adjectives, and adverbs are more likely than other POS such as nouns or articles. As such, in some configurations, words that are tagged as a verb, adjective, or adverbs are extracted for further processing while words that are tagged as other parts of speech are not extracted. Note that the words tagged as other parts of speech suitably additionally or alternatively can be used.

Such preprocessing operations also or alternatively can include converting words to lowercase, e.g., removing leading capital letters from words. Python includes instructions for such conversions, such as the ".lower( )" instruction. Such preprocessing operations also or alternatively can include lemmatizing verbs, e.g., identifying the "lemma," sometimes referred to as the canonical or citation form, of the verb (such as "prepare") and replacing a variant of the verb (such as "prepared") with its lemma. Software resources for performing such lemmatizing are publicly available, such as the NLTK.stem or NTLK WordNet software packages for Python. Such preprocessing operations also or alternatively can include parsing the text for alternatives indicated by "/", such as the alternatives "a/b" which may in some circumstances appear as a single token, and converting such alternatives to separate tokens for each alternative, such as "a" and "b." Such preprocessing also or alternatively can include parsing the text so as to remove stopwords (such as "a" or "the"), remove punctuation, and/or remove strings with punctuation or a digit within the string. Python includes regular expression operations for conducting such preprocessing.

Operation 220 illustrated in FIG. 2 can include classifying the preprocessed words of the free-form text, e.g., by classification engine 151 operated by processing system 150 illustrated in FIG. 1 and/or by client device 110. In some configurations, such classifying optionally can include comparing the preprocessed words to a set of words that were previously classified as being male-biased, female-biased, or neutral. Based upon a preprocessed word matching a word of the previously classified set, the preprocessed word can be classified in the class as that previously word, e.g., so as to avoid or reduce the need to perform complex machine learning based classification for such words, thus reducing the computational power needed to classify words of the free-form text. An example subset of previously classified (labeled) words is provided below in Table 1.

TABLE 1

Exemplary Previously Classified Words

| word | label |
| --- | --- |
| active | male |
| adventurous | male |
| aggressive | male |
| aggressively | male |
| ambitious | male |
| ambition | male |
| analyze | male |
| analysis | male |
| analytical | male |
| assertive | male |
| assertively | male |
| athletic | male |
| autonomous | male |
| autonomy | male |
| boast | male |
| boasts | male |
| challenges | male |

In operation 220 illustrated in FIG. 1, based upon a preprocessed word not matching a word of the previously classified set, the preprocessed word can be classified by inputting it to the machine-learning model of the classifier. The machine-learning model can be trained in a manner such as described below with reference to FIG. 3. The output of operation 220, whether the classification is based upon a match between the preprocessed word and a previously classified word, or is based upon input of the preprocessed word to the machine-learning model of the classifier, can include the word and data regarding the class into which the word is classified, e.g., a label indicating male-bias, female-bias, or neutral. For individual words, the classifier can output the respective probabilities of those words being male-biased, female-biased, or neutral. The words can be classified respectively with the label for which the probability is the highest. In one example, the classifier determines that the word "sensitive" has about a 10% probability of being male-biased, about a 90% probability of being female-biased, and about a 0% probability of being neutral. Based on these probabilities, the classifier therefore determines that the word "sensitive" has the highest probability of being female-biased, and labels the word as female-biased.

Referring again to FIG. 2, method 200 also can include operation 230 of flagging, in the GUI, at least one of the words classified into the male-biased class or the female-biased class. For example, responsive to obtaining a word and its classification (whether such classification was performed at client device 110 or at processing system 150), the GUI of client device 110 can flag that word. Flagging a word can include changing the appearance of the word, as it is displayed within the GUI, in such a manner as to visually distinguish the word from other displayed words that are not flagged, and optionally also so as to visually distinguish the word as being either male-biased or female-biased. Such flagging can include, for example, any suitable combination of one or more of highlighting the word (e.g., with different colors of highlighting used to indicate male-biased versus female-biased), changing the color of the word (e.g., with different word colors used to indicate male-biased versus female-biased), changing the emphasis of the word (e.g., with differently bolding, italicizing, and/or underlining the word to indicate male-biased versus female-biased), changing the font (e.g., with different typeface and/or size of the word to indicate male-biased versus female-biased), or any other suitable change or combination of changes to the appearance of the word in such a manner as to visually distinguish the word from other words that are not flagged and/or that are in a different one of male-biased or female-biased class. Additionally, or alternatively, such flagging can include displaying the word in an area of the graphical user interface that is separate from the free-form text.

Figure 4:
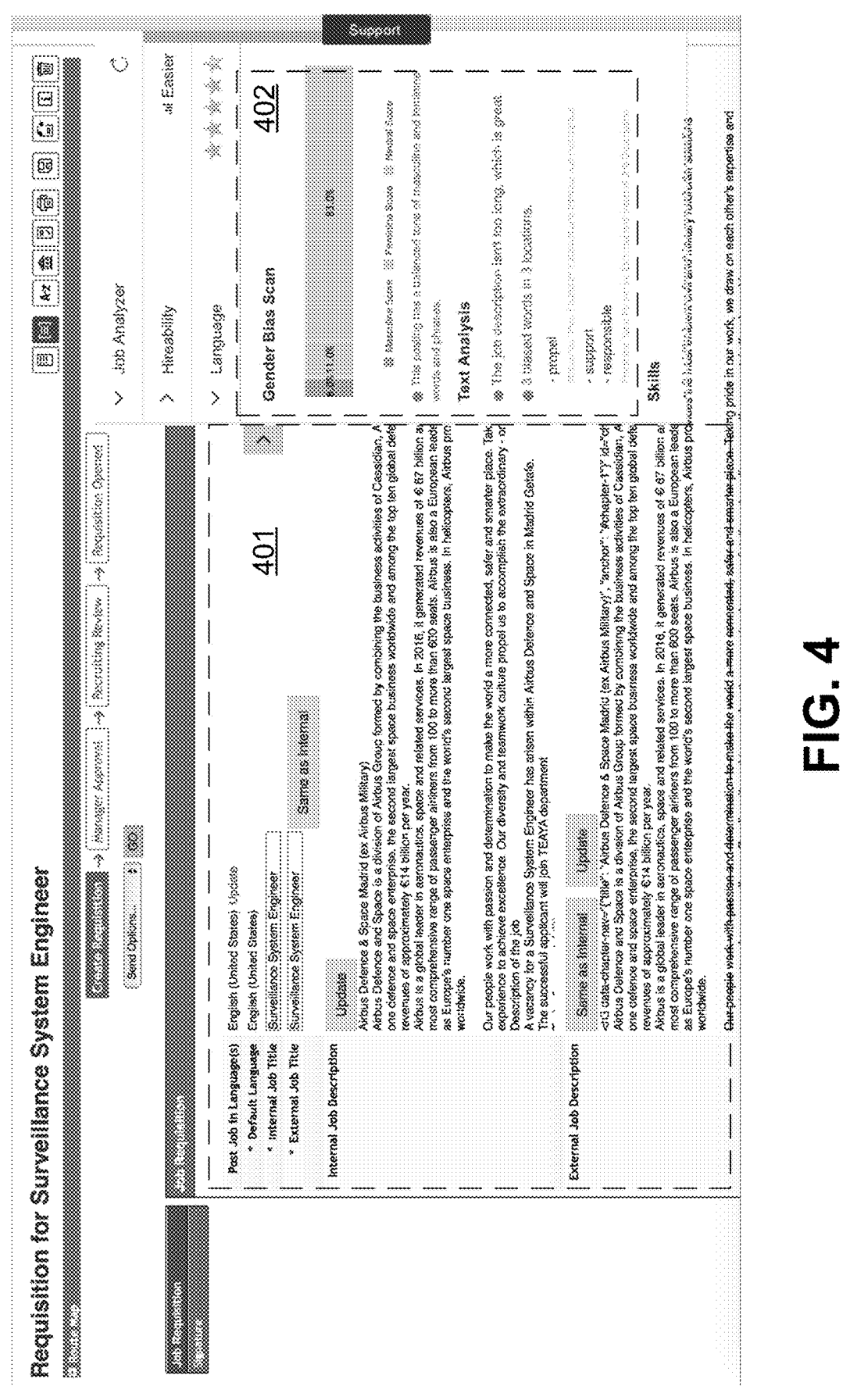

Illustratively, FIG. 4 is an example GUI illustrating flagging of gender biased words within a job description and display of a gender bias score for the job description, e.g., such as can be displayed by client device 110. In the non-limiting example shown in FIG. 4, a GUI displaying a "Requisition for Surveillance System Engineer" is shown that includes forms 401 for user input including one or more of requisition identification (ID) number associated with the job, a position number of the job, a job code for the job, an identification of one or more languages in which the job description is to be posted, a default language of the job description, an internal job title, an external job title, and a job start date, in addition to a form for receiving free-form text, e.g., a job description. Optionally, respective forms can be provided for receiving free-form text for both an internal job description and an external job description. The exemplary GUI shown in FIG. 4 also includes an area 402 of the GUI that is separate from the free-form text, e.g., a column to the side (such as to the right or left) of the area of the GUI that receives the free-form text and other user input, and that includes a list of words that were flagged as male-biased or female-biased during operation 220. In this example, the word "propel" have been flagged as being male-biased (having masculine tone) and the words "support" and "responsible" have been flagged as being female-biased (having feminine tone) and are listed as such in the GUI. Area 402 optionally also or alternatively includes a gender bias score for the free-form text. The gender bias score can, for example, be graphically displayed, e.g., as a line, color distinction, or other indicator along a sliding scale representing an amount of male-to-female or female-to-male gender bias, in a manner similar to that shown in area 402 of FIG. 4. Additionally, or alternatively, the gender bias score can be displayed as a numerical value representing an amount of male-to-female or female-to-male gender bias. In this example, the free text has been determined to be 6.0% male-biased (masculine score), 11.0% female-biased (feminine score), and 83.0% neutral, based on which area 402 states that "This posting has a balanced score of masculine and feminine words and phrases." Exemplary operations for generating a gender bias score are provided elsewhere herein.

Referring again to FIG. 2, method 200 also can include operation 240 of receiving, in the GUI, second user input including at least one revision to at least one of the words of the free-form text classified into the male-biased class or the female-biased class responsive to the flagging. For example, the GUI can accept user modifications, deletions, or replacement of word(s) of the free-form text flagged as male-biased or female-biased, thus potentially reducing gender bias of the free-form text. Optionally, operations 220 and 230 can be repeated on the revised free-form text so as to flag words of such revised text that are classified into the male-biased class or the female-biased class, thus facilitating further revision of the text.

Method 200 illustrated in FIG. 2 further can include operation 250 of posting, by a recruiting engine of the computer system, the revised free-form text to a web site for display in a second GUI forming part of the end-user layer of the computer system. For example, system 100 shown in FIG. 1 can post revised free-form text to a web site for display within a GUI of client device 110'. Such web site can be hosted by server(s) 140. As such, system 100 can provide an end-to-end control of receiving and revising free-form text, classifying and flagging gender-biased word(s) therein, posting that free-form text for consumption by users at a web site, and optionally receiving further user input based on the posting. In examples in which the revised free-form text is a job description, the web site can receive applications to the corresponding jobs for processing by server(s) 140. It can be expected that the pool of applicants to such jobs are more gender balanced than if the job descriptions had not been revised based on the flagging of gender-biased words therein.

At operation 220 of method 200 illustrated in FIG. 2, classification engine of the computer system incorporating a machine-learning model can classify words within the free-form text, e.g., into a male-biased class or a female-biased class. It should be appreciated that not all words necessarily fall into either of these two classes, e.g., not all words are gender-biased, and such non-gender biased words can be classified a neutral class. The classification engine of the computer system can incorporate any suitable machine learning model, such as a support vector machine, random forest algorithm, or stochastic gradient descent classifier (logistic regression). The classification engine can be trained using a corpus of words that respectively are labeled as male-biased, female-biased, or neutral. Optionally, each word of the corpus is provided to the classification engine as a word vector.

Figure 3:
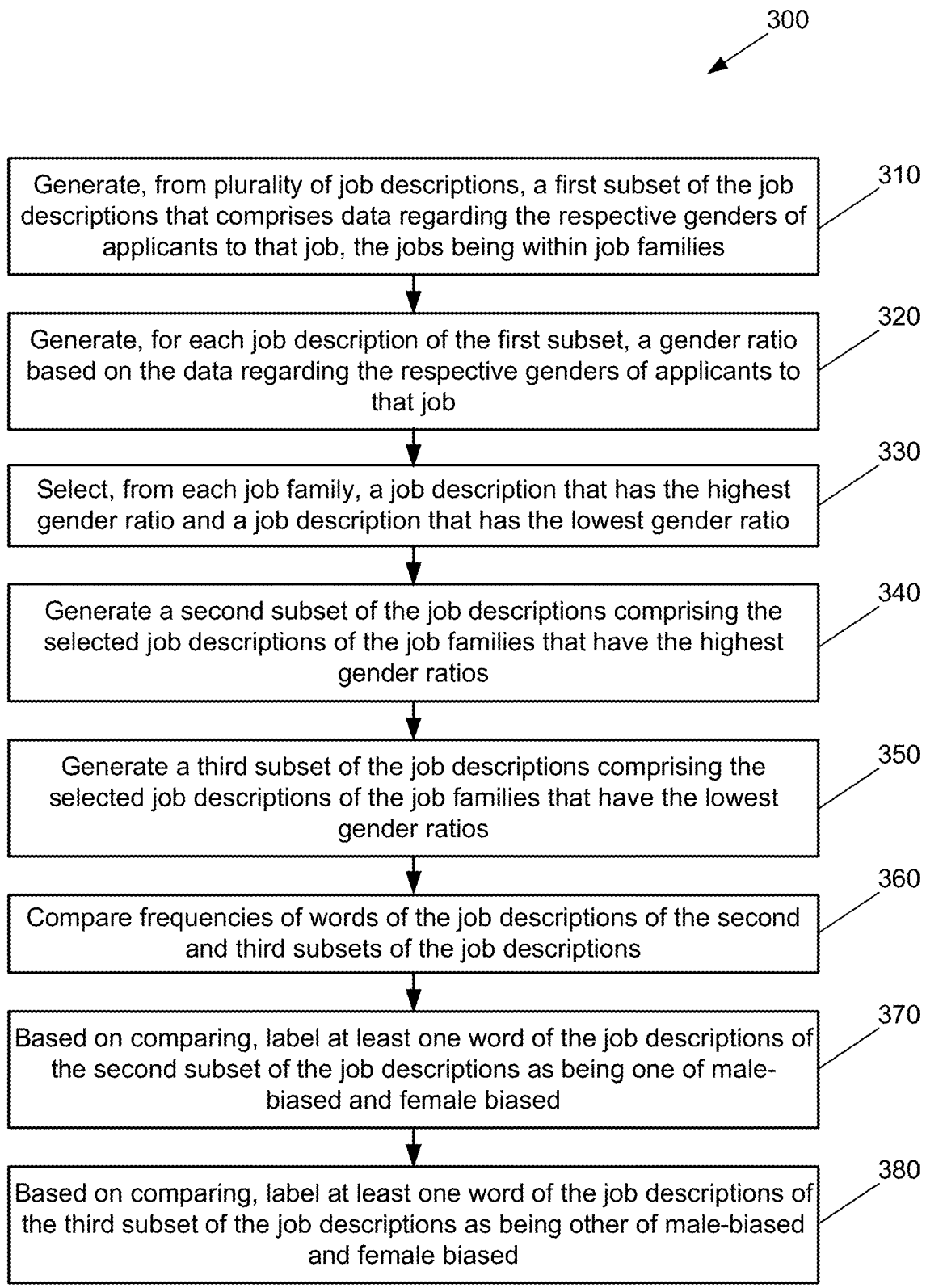
FIG. 3 is an example process flow diagram for labeling gender biased words for use in training a classification engine incorporating a machine learning model.

The words of the training corpus can be labeled as male-biased, female-biased, or neutral in any suitable manner, and not all words necessarily need to be labeled as male-biased, female-biased, or neutral as in the same way as one another. In one example, words of the training corpus can be labeled as male-biased, female-biased, or neutral based upon usage of those words within job descriptions for which the genders of actual applicants to those jobs were known, based upon which biasing effects of words within those job descriptions can be inferred. For example, FIG. 3 is an example process flow diagram for labeling gender biased words for use in training a classification engine incorporating a machine learning model. Illustratively, the labeling of such words can include an operation generating, from a plurality of job descriptions, a first subset of the job descriptions that includes data regarding the respective genders of applicants to that job (operation 310 of method 300 illustrated in FIG. 3). For example, within system 100 illustrated in FIG. 1, classification engine 151 of processing system 150 can retrieve job descriptions from data store(s) 170 for jobs that respectively had been applied to by job applicants, e.g., via web sites posted for display by GUIs of client devices 110' and hosted by server(s) 140. Optionally, the jobs are within job families in a manner such as described herein. For at least some of such job descriptions, data store(s) 170 also can include the respective genders of the job applicants. For example, the GUIs of client devices 110' can include respective forms for receiving the gender of the job applicant, and such gender can be stored in data store(s) 170 and retrieved by processing system 150.

Based on the data regarding the respective genders of applicants to each job for which genders of job applicants are known, a gender ratio can be generated (operation 320 of method 300). For example, classification engine 151 of processing system 150 can generate a gender ratio for that job e.g., by dividing the number of male applicants to that job by the number of female applicants to that job, or vice versa. In addition to analyzing jobs for which genders of job applicants are known, classification engine 151 of processing system 150 optionally can be configured to limit its analysis to jobs meeting one or more other criteria, such as job descriptions that are in a particular language (such as English), that are for a particular region (such as the United States), or that include at least a threshold number of words (such as 250 words).

The labeling of words in the training corpus as male-biased, female-biased, or neutral also can include an operation selecting, from each job family, a job description that has the highest gender ratio and a job description that has the lowest gender ratio (operation 330 of method 300). For example, some jobs can attract a greater proportion of male applicants or a greater proportion of female applicants regardless of the particular language used in the job description. So as to reduce the effect of such job-related bias, as distinguished from job-description related bias, classification engine 151 of processing system 150 can group jobs by job families and can select the descriptions respectively having the most female-biased applicant pool and having the most male-biased applicant pool from within each job family. Because such job descriptions are for jobs within the same family as one another (and thus may have similar job-related biases as one another) it can be expected that biases within the applicant pool for those jobs arise from words used in the job descriptions.

The labeling of words in the training corpus as male-biased, female-biased, or neutral also can include an operation generating a second subset of the job descriptions that includes the selected job descriptions of the job families that have the highest gender ratios (operation 340 of method 300); and generating a third subset of the job descriptions that includes the selected job descriptions of the job families that have the lowest gender ratios (operation 350 of method 300). For example, classification engine 151 of processing system 150 can group the job descriptions with the most female-biased applicant pools together, and can group the job descriptions with the most male-biased applicant pools together.

The labeling of words in the training corpus as male-biased, female-biased, or neutral also can include an operation comparing frequencies of words of the job descriptions of the second and third subsets of the job descriptions (operation 360 of method 300). For example, certain words can occur more frequently among the job descriptions that have the highest gender ratios, and certain other words can occur more frequently among the job descriptions that have the lowest gender ratios. The labeling of words in the training corpus as male-biased, female-biased, or neutral also can include operations, based on the comparing, of labeling at least one word of the job descriptions of the second subset of the job descriptions as being one of male-biased and female-biased (operation 370 of method 300), and labeling at least one word of the job descriptions of the third set of the job descriptions as being the other of male-biased and female-biased. For example, if the second subset of job descriptions corresponds to jobs with the most female-biased applicant pools, classification engine 151 of processing system 150 can label one or more words of those job descriptions as being female-biased (operation 380 of method 300), e.g., based upon a relatively high frequency of those words within those job descriptions as compared to within the male-biased job descriptions. Or, for example, if the third subset of job descriptions corresponds to jobs with the most male-biased applicant pools, classification engine 151 of processing system 150 can label one or more words of those job descriptions as being male-biased, e.g., based upon a relatively high frequency of those words within those job descriptions as compared to within the female-biased job descriptions. Classification engine 151 of processing system 150 can label as neutral words that appear with similar frequencies as one another in both the female-biased and male-biased job descriptions. The particular format of the labeling can be suitably selected. Table 1 above provides one exemplary labeling format, and is not limiting.

Words of the training corpus also or alternatively can be labeled based on any other suitable criteria. For example, research previously has been published regarding the effect of wording differences within job advertisements upon applicant pools, and based upon which some words have been labeled as "masculine" or "feminine." Such words optionally can be included within the training corpus, for example together with words labeled using operations such as described with reference to FIG. 3. For exemplary words that can be included within the training corpus, see the following reference, the entire contents of which are incorporated by reference herein: Gaucher et al., "Evidence that Gendered Wording in Job Advertisements Exists and Sustains Gender Inequality," Journal of Personality and Social Psychology (Mar. 7, 2011): 1-20. Additionally, or alternatively, certain words such as stop words can be designated as neutral. Python's NLTK.corpus includes neutral stop words that can be included within the training corpus.

Referring again to FIG. 1, the classification engine 151 incorporating the machine learning model can be trained using the training corpus of labeled words (e.g., generated using operations such as described above) so as to extract features indicating male-bias, female-bias, or neutrality. In one example, the words of the training corpus are converted to word vectors that are input into the classification engine 151 together with the labels of the respective words. Word vectors for words are readily publicly available. Following such training, operation 220 illustrated in FIG. 2 can be implemented by classification engine 151. In one example, words of the free-form text can be preprocessed in a manner such as described with reference to operation 220, and converted to word vectors in a similar manner as described with reference to generation of the training corpus for input into classification engine 151.

It should be noted that operations such as described herein for generating a training corpus for gender biased words within job descriptions suitably can be modified for use in generating a training corpus for any other type of free-form text, and words within such type of free-form text suitably can be classified and flagged similarly as described herein. For example, the training corpus can be generated based on frequencies of words within any type of free-form text that suitably can be categorized as male-biased or female-biased; a classification engine trained based on such training corpus; and the trained classification engine then used to classify words within other free-form text of that type for flagging gender-biased words therein, based upon which the free-form text can be revised and posted to a web site for display in a GUI, e.g., as described elsewhere herein.

Additionally, as noted elsewhere herein, bias scores for free-form text can be generated and displayed in a GUI into which the free-form text is entered. For example, scoring engine 152 illustrated in FIG. 1 can be configured so as to generate a bias score for free-form text that is classified by classification engine 151, and such bias score can be displayed in a GUI of client device 110 into which the free-form text is entered. In one nonlimiting configuration, bias scores can be generated based on a hyperbolic tangent (tanh) function in which the score increases relatively quickly with the frequency of gender-biased words and gradually approaches an asymptote. The asymptote can be designed such that, for a given gender, based upon the number of words biased towards that gender reaching a threshold (e.g., 5%, 10%, 15%, 20%, or 25%) of the total number of words, then the tanh will approach 1. An example score for male bias MB of free-form text can be expressed as:

$MB=\tanh(t \times m/w)/2$ where w is the total number of words in the free-form text, m is the number of words in the free-form text classified as male-biased, and t is a multiplier selected such that the score approaches 1 when the number of biased words approaches the threshold. For example, for a threshold of 20%, a multiplier t=10 can be used; e.g., $\tanh(10*20/100)=0.964$. An example score for female bias FB of free-form text can be expressed as:

$FB=\tanh(t \times f/w)/2$ where f is the number of words in the free-form text classified as female-biased. An example score for neutral words NW in the free-form text can be expressed as:

$NW=1-MB-FB$.

In one purely illustrative example, based upon a job description having 100 words with 9 words classified as male-biased and 8 words classified as female-biased and a threshold of 20%, MB can be expressed as:

$MB=\tanh(10*9/100)/2=0.358(35.8\%)$ and FB can be expressed as:

$FB=\tanh(10*8/100)/2=0.332(33.2\%)$ and the score for neutral words NW can be expressed as:

$NW=1-0.358-0.332=0.31(31\%)$.

In this example, note that because the free-form text includes a similar number of male-biased words as female-biased words, the gender bias of the text is relatively low. In one nonlimiting example, a score of female-bias can be generated by setting f equal to the number of words with a 90% or greater probability of being female biased, setting m equal to be the number of words with a 90% or greater probability of being male biased, and calculating MB, FB, and NW. These values can be graphically and/or numerically displayed in a graphical user interface, e.g., such as illustrated in FIG. 4.

Optionally, the bias score can be updated following revision of the free-form text (e.g., following operation 240 illustrated in FIG. 2). For example, method 200 illustrated in FIG. 2 further can include operations of respectively classifying, by the classification engine of the computer system, each word of the revised free-form text into the male-biased class, the female-biased class, or the neutral class, at least one of the words being classified into the male-biased class or the female-biased class; generating, by the scoring engine of the computer system, a revised gender bias score for the revised free-form text based on the classification of the words of the revised free-form text; and displaying, in the graphical user interface, the revised gender bias score.

Accordingly, among other things, the present systems, methods, and computer-readable media provide an end-user layer with a first GUI receiving free-form text and flagging gender-biased words of the free-form text for revision and a second GUI posting the revised free-form text, and a classification engine classifying words of the free-form text into gender-bias classes. Although the free-form text illustratively can include job descriptions, it should appreciate that any suitable type of free-form text can be processed in a manner such as provided herein.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 5:
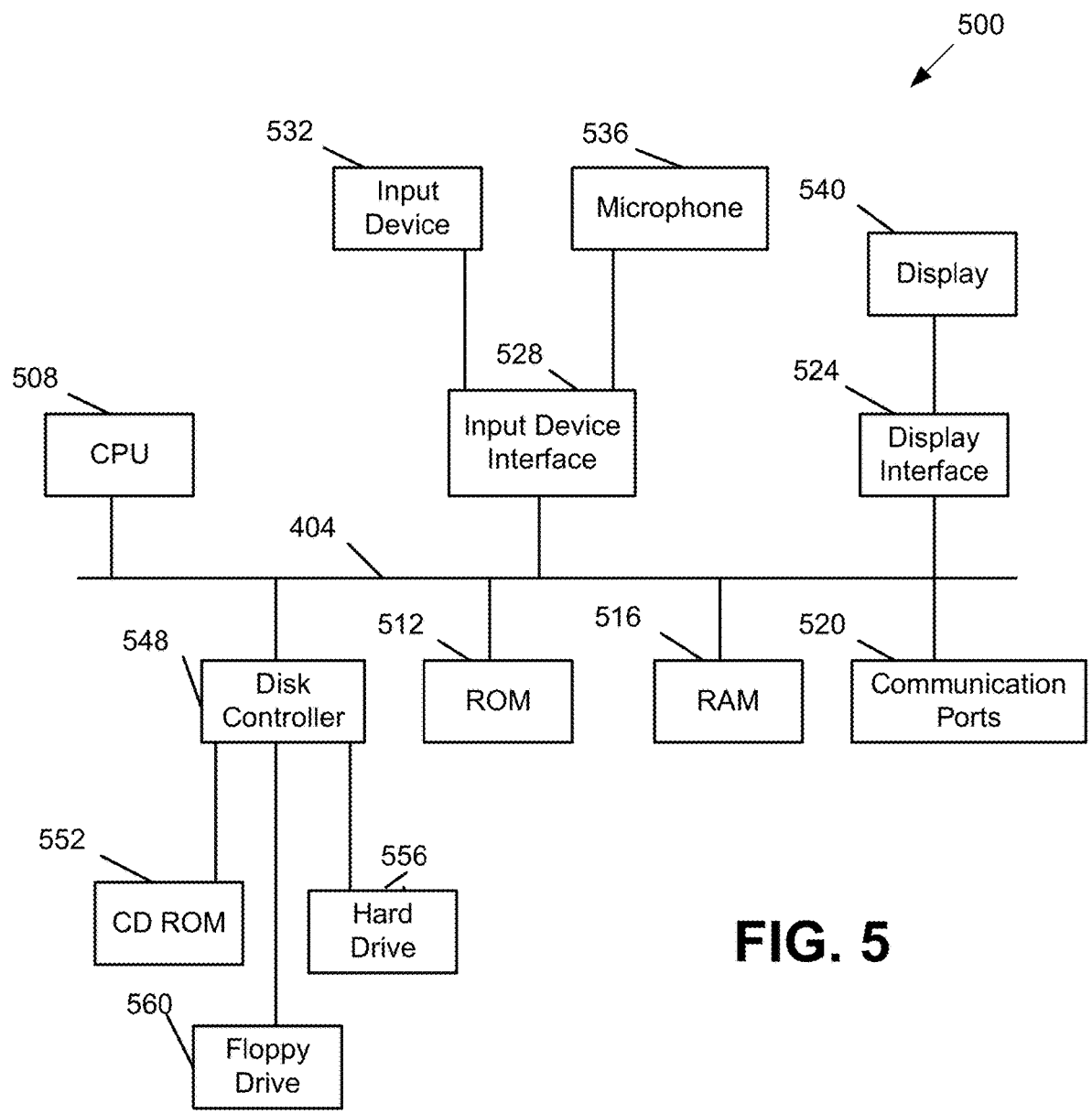
FIG. 5 is a diagram illustrating a sample computing device architecture for implementing various aspects described herein.

FIG. 5 is a diagram 500 illustrating a sample computing device architecture for implementing various aspects described herein, such as any aspect that can be processed using server(s) 140, client device(s) 110 or 110', or processing system 150 executing classification engine 151 or scoring engine 152. A bus 504 can serve as the information highway interconnecting the other illustrated components of the hardware. A processing system 508 labeled CPU (central processing unit) (e.g., one or more computer processors/data processors at a given computer or at multiple computers), can perform calculations and logic operations required to execute a program. A non-transitory processor-readable storage medium, such as read only memory (ROM) 512 and random access memory (RAM or buffer) 516, can be in communication with the processing system 508 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 548 can interface one or more optional disk drives to the system bus 504. These disk drives can be external or internal floppy disk drives such as 560, external or internal CD-ROM, CD-R, CD-RW or DVD, or solid state drives such as 552, or external or internal hard drives 556. As indicated previously, these various disk drives 552, 556, 560 and disk controllers are optional devices. The system bus 504 can also include at least one communication port 520 to allow for communication with external devices either physically connected to the computing system or available externally through a wired or wireless network. In some cases, the communication port 520 includes or otherwise comprises a network interface.

To provide for interaction with a user, the subject matter described herein can be implemented on a computing device having a display device 540 (e.g., a CRT (cathode ray tube) or LCD (liquid crystal display) monitor) for displaying information obtained from the bus 504 to the user and an input device 532 such as keyboard and/or a pointing device (e.g., a mouse or a trackball) and/or a touchscreen by which the user can provide input to the computer. Other kinds of input devices 532 can be used to provide for interaction with a user as well; for example, feedback provided to the user can be any form of sensory feedback (e.g., visual feedback, auditory feedback by way of a microphone 536, or tactile feedback); and input from the user can be received in any form, including acoustic, speech, or tactile input. In the input device 532 and the microphone 536 can be coupled to and convey information via the bus 504 by way of an input device interface 528. Other computing devices, such as dedicated servers, can omit one or more of the display 540 and display interface 524, the input device 532, the microphone 536, and input device interface 528.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, in a first graphical user interface (GUI) forming part of an end-user layer of a computer system, first user input comprising free-form text;
   respectively classifying, by a machine learning model being executed by the computer system, words of the free-form text into a male-biased class, a female-biased class, or a neutral class, at least one of the words being classified into the male-biased class or the female-biased class, the machine learning model being trained using a plurality of historical job descriptions for which a ratio of the gender of the applicants is known and with a plurality of words labeled as being a male-biased class, a female-biased class, or a neutral class derived from a historical job description having a highest ratio and a historical job description having a lowest ratio;
   flagging, in the first GUI, at least one of the words classified into the male-biased class or the female-biased class;
   receiving, in the first GUI, second user input comprising at least one revision to at least one of the words of the free-form text classified into the male-biased class or the female-biased class responsive to the flagging; and
   posting, by the computer system, the revised free-form text to a web site for display in a second GUI forming part of the end-user layer of the computer system.

2. The method of claim 1, further comprising:
   generating, by the computer system, a gender bias score for the free-form text based on the classification of the words of the free-form text; and
   displaying, in the first GUI, the gender bias score.

3. The method of claim 2, further comprising:
   respectively classifying, by the machine learning model engine of the computer system, each word of the revised free-form text into the male-biased class, the female-biased class, or the neutral class, at least one of the words being classified into the male-biased class or the female-biased class;
   generating, by the computer system, a revised gender bias score for the revised free-form text based on the classification of the words of the revised free-form text; and displaying, in the first GUI, the revised gender bias score.

4. The method of claim 1, wherein a first subset of words of the corpus are labeled as male-biased, female-biased, or neutral using operations comprising:
generating, from a plurality of job descriptions, a first subset of the job descriptions that comprises data regarding the respective genders of applicants to that job, the jobs being within job families;
generating, for each job description of the first subset, a gender ratio based on the data regarding the respective genders of applicants to that job;
selecting, from each job family, a job description that has the highest gender ratio and a job description that has the lowest gender ratio;
generating a second subset of the job descriptions comprising the selected job descriptions of the job families that have the highest gender ratios;
generating a third subset of the job descriptions comprising the selected job descriptions of the job families that have the lowest gender ratios;
comparing frequencies of words of the job descriptions of the second and third subsets of the job descriptions; and
based on the comparing:
labeling at least one word of the job descriptions of the second subset of the job descriptions as being one of male-biased and female-biased, and
labeling at least one word of the job descriptions of the third set of the job descriptions as being the other of male-biased and female-biased.

5. The method of claim 1, wherein the flagging comprises highlighting the word, changing a color of the word, changing an emphasis of the word, or changing a font of the word.

6. The method of claim 1, wherein the flagging comprises displaying the word in an area of the first GUI that is separate from the free-form text.

7. The method of claim 1, wherein the machine learning model comprises a support vector machine, a random forest algorithm, a stochastic gradient descent classifier, or a logistic regression model.

8. A computer system comprising:
at least one data processor; and
memory storing instructions which, when executed by the at least one data processor, result in operations comprising:
receiving, in a first graphical user interface (GUI) forming part of an end-user layer of the computer system, first user input comprising free-form text;
respectively classifying, by a machine learning model being executed by the computer system, words of the free-form text into a male-biased class, a female-biased class, or a neutral class, at least one of the words being classified into the male-biased class or the female-biased class, the machine learning model being trained using a plurality of historical job descriptions for which a ratio of the gender of the applicants is known and with a plurality of words labeled as being a male-biased class, a female-biased class, or a neutral class derived from a historical job description having a highest ratio and a historical job description having a lowest ratio;
flagging, in the first GUI, at least one of the words classified into the male-biased class or the female-biased class;
receiving, in the first GUI, second user input comprising at least one revision to at least one of the words of the free-form text classified into the male-biased class or the female-biased class responsive to the flagging; and
posting, by the computer system, the revised free-form text to a web site for display in a second GUI forming part of the end-user layer of the computer system.

9. The computer system of claim 8, the memory further storing instructions which, when executed by the at least one data processor, result in operations comprising:
generating, by the computer system, a gender bias score for the free-form text based on the classification of the words of the free-form text; and
displaying, in the first GUI, the gender bias score.

10. The computer system of claim 9, the memory further storing instructions which, when executed by the at least one data processor, result in operations comprising:
respectively classifying, by the machine learning model, each word of the revised free-form text into the male-biased class, the female-biased class, or the neutral class, at least one of the words being classified into the male-biased class or the female-biased class;
generating, by the computer system, a revised gender bias score for the revised free-form text based on the classification of the words of the revised free-form text; and
displaying, in the first GUI, the revised gender bias score.

11. The computer system of claim 8, wherein a first subset of words of the corpus are labeled as male-biased, female-biased, or neutral using operations comprising:
generating, from a plurality of job descriptions, a first subset of the job descriptions that comprises data regarding the respective genders of applicants to that job, the jobs being within job families;
generating, for each job description of the first subset, a gender ratio based on the data regarding the respective genders of applicants to that job;
selecting, from each job family, a job description that has the highest gender ratio and a job description that has the lowest gender ratio;
generating a second subset of the job descriptions comprising the selected job descriptions of the job families that have the highest gender ratios;
generating a third subset of the job descriptions comprising the selected job descriptions of the job families that have the lowest gender ratios;
comparing frequencies of words of the job descriptions of the second and third subsets of the job descriptions; and
based on the comparing:
labeling at least one word of the job descriptions of the second subset of the job descriptions as being one of male-biased and female-biased, and
labeling at least one word of the job descriptions of the third set of the job descriptions as being the other of male-biased and female-biased.

12. The computer system of claim 8, wherein the flagging comprises highlighting the word, changing a color of the word, changing an emphasis of the word, or changing a font of the word.

13. The computer system of claim 8, wherein the flagging comprises displaying the word in an area of the first GUI that is separate from the free-form text.

14. The system of claim 8, wherein the machine learning model comprises a support vector machine, a random forest algorithm, a stochastic gradient descent classifier, or a logistic regression model.

15. A non-transitory computer-readable medium storing instructions which, when executed by at least one data processor of a computer system, result in operations comprising:
    receiving, in a first graphical user interface (GUI) forming part of an end-user layer of the computer system, first user input comprising free-form text;
    respectively classifying, by a machine learning model being executed by the computer system, words of the free-form text into a male-biased class, a female-biased class, or a neutral class, at least one of the words being classified into the male-biased class or the female-biased class, the machine learning model being trained using a plurality of historical job descriptions for which a ratio of the gender of the applicants is known and with a plurality of words labeled as being a male-biased class, a female-biased class, or a neutral class derived from a historical job description having a highest ratio and a historical job description having a lowest ratio;
    flagging, in the first GUI, at least one of the words classified into the male-biased class or the female-biased class;
    receiving, in the first GUI, second user input comprising at least one revision to at least one of the words of the free-form text classified into the male-biased class or the female-biased class responsive to the flagging; and
    posting, by the computer system, the revised free-form text to a web site for display in a second GUI forming part of the end-user layer of the computer system.

16. The computer-readable medium of claim 15, further storing instructions which, when executed by the at least one data processor, result in operations comprising:
    generating, by the computer system, a gender bias score for the free-form text based on the classification of the words of the free-form text; and
    displaying, in the first GUI, the gender bias score.

17. The computer-readable medium of claim 16, further storing instructions which, when executed by the at least one data processor, result in operations comprising:
    respectively classifying, by the machine learning model, each word of the revised free-form text into the male-biased class, the female-biased class, or the neutral class, at least one of the words being classified into the male-biased class or the female-biased class;
    generating, by the computer system, a revised gender bias score for the revised free-form text based on the classification of the words of the revised free-form text; and
    displaying, in the first GUI, the revised gender bias score.

18. The computer-readable medium of claim 16, wherein a first subset of words of the corpus are labeled as male-biased, female-biased, or neutral using operations comprising:
    generating, from a plurality of job descriptions, a first subset of the job descriptions that comprises data regarding the respective genders of applicants to that job, the jobs being within job families;
    generating, for each job description of the first subset, a gender ratio based on the data regarding the respective genders of applicants to that job;
    selecting, from each job family, a job description that has the highest gender ratio and a job description that has the lowest gender ratio;
    generating a second subset of the job descriptions comprising the selected job descriptions of the job families that have the highest gender ratios;
    generating a third subset of the job descriptions comprising the selected job descriptions of the job families that have the lowest gender ratios;
    comparing frequencies of words of the job descriptions of the second and third subsets of the job descriptions; and
    based on the comparing:
        labeling at least one word of the job descriptions of the second subset of the job descriptions as being one of male-biased and female-biased, and
        labeling at least one word of the job descriptions of the third set of the job descriptions as being the other of male-biased and female-biased.

19. The computer-readable medium of claim 15, wherein the flagging comprises highlighting the word, changing a color of the word, changing an emphasis of the word, changing a font of the word, or displaying the word in an area of the first GUI that is separate from the free-form text.

20. The computer-readable medium of claim 15, wherein the machine learning model comprises a support vector machine, a random forest algorithm, a stochastic gradient descent classifier, or a logistic regression model.

* * * * *